United States Patent [19]

Han

[11] 4,427,512
[45] Jan. 24, 1984

[54] WATER DECOMPOSITION METHOD AND DEVICE USING IONIZATION BY COLLISION

[76] Inventor: Tay-Hee Han, 202, 6 dong Gangnam Apt, Banpo 2 dong, Gangnam-Gu, Seoul, Rep. of Korea

[21] Appl. No.: 404,407

[22] Filed: Aug. 2, 1982

Related U.S. Application Data

[63] Continuation of Ser. No. 167,147, Jul. 8, 1980, abandoned.

[51] Int. Cl.$^3$ .............................................. B01K 1/00
[52] U.S. Cl. ................................. 204/164; 422/186; 423/579; 423/648 R
[58] Field of Search ................ 422/186, 149; 204/164; 423/523, 579, 648 R

[56] References Cited

PUBLICATIONS

Kurtenkov, Electrochemistry in Industrial Processing and Biology No. 6, pp. 53–56 (1973).
Curl, Int. J. Hydrogen Energy, vol. 4, pp. 13–20 1/79.

*Primary Examiner*—F. Edmundson
*Attorney, Agent, or Firm*—Fleit, Jacobson, Cohn & Price

[57] ABSTRACT

This invention relates to the decomposition of water into oxygen and hydrogen by the effect of ionization by collision among the water molecules. Water of liquid dielectric characteristics is contained within a solid dielectric container having higher dielectric constant relative to that of the water, the solid dielectric also having thermostability. A high voltage is then applied to the solid dielectric, creating a strong enough electric field, exceeding the covalent bond of the liquid dielectric, to decompose the water, while the solid dielectric container maintains its stability.

6 Claims, 4 Drawing Figures

WATER DECOMPOSITION METHOD AND DEVICE USING IONIZATION BY COLLISION

This is a continuation of application Ser. No. 167,147 filed July 8, 1980, now abandoned.

BACKGROUND OF THE INVENTION

Until now, we have used the electrochemical reaction in electrolysis, in which the tons in the electrolyte flow to the opposite electrode to decompose the electrolyte and make pure metals on the surface of the electrode when the electrode is put into the electrolyte and the direct current is changed with.

In addition, in the case of non-electrolyte the electrolysis does not happen though equipping the dielectric with the electrode. And if the higher voltage is given to the dielectric than the withstanding voltage strength of the dielectric, the electrolyte is broken down in the dielectric and the large quantity of electric current is flowed between the electrodes.

We have only considered the prevention of the dielectric breakdown because when these dielectric breakdown happens, the molecules of the dielectric are often decomposed, but this dielectric and electrical machinery become useless.

DESCRIPTION OF THE PRIOR ART

U.S Pat. No. 3,674,676 about the electrode used in above electrolysis. The cathod covered with the diaphragm is used at a regular interval from the neighboring anode which is made by using titanium plate or expanded metal or platinum group. And according to West-Germany Declaration Pat. No. 72/12225 is known to use the asbestos diaphragm with perfluoro ethylen or trifluoro ethylene sulfon acid having positive ion exchangeability. But according to above Patents, they have the weak point that they lose exchange-ability and need much expenditure making the diaphragm.

SUMMARY OF THE INVENTION

It is an object of the present invention to provide the water decomposition method using ionization by collision and another object of the invention is to provide the water decomposition device.

The characteristic of this invention is to decompose oxygen($O_2$) and Hydrogen($H_2$) from the water molecules by causing ionization by collision, making complex dielectric layer filled with liquid dielectric, that is, water between the solid dielectric plate having the high dielectric constant and withstanding voltage strength, and by causing strong electric field strength over the withstanding voltage strength in liquid dielectric having relatively low dielectric constant in comparision with the solid dielectric.

Then as low electric field strength short of the loithstanding voltage strength is formed at both side of the liquid dielectric and the solid dielectric restrain much electric discharge current to flow between the electrodes keeping stable state, the water continuously receives the strong electric field strength, and therefore water-molecules are decomposed.

If the two kinds of dielectric which are differing in dielectric constant comprise 3-layer, that is, we put two same electric plate and put another dielectric between them, the dielectric which has high dielectric constant receives low electric field strength, and high electric field strength is formed at the low dielectric of low dielectric constant.

Then the dielectric intruded receives stronger electric field strength than both side of the dielectrics.

When the electric field strength exceeds the withstanding voltage strength of its own, the molecules of the liquid dielectric is decomposed by ionization by collision, the dielectric breakdown happens and then both side of the dielectric layer can be in stable state because it receives weak electric field strength.

Therefore in the case of passing strong voltage to the complex dielectric layer, the strong electric field strength can be formed at a layer and the molecules of the liquid dielectric can be decomposed by the ionization by collision.

This invention is illustrated according to the appended figure.

DETAILED DESCRIPTION OF THE PREFERRED EMBODIMENTS

Figure 1:
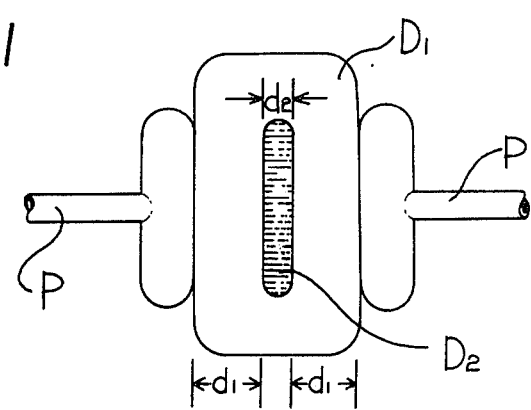
FIG. 1: a cross section for illustration this invention.
Figure 2:
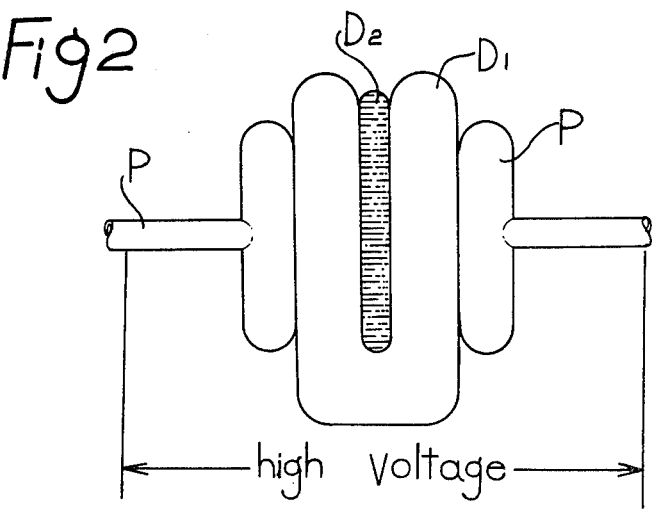
FIG. 2: a side-view

From the FIG. 1 and FIG. 2, the solid dielectric ($D_1$) forms "U", the middle interval ($d_2$) is filled with liquid dielectric and the both side of the solid dielectric ($D_1$) has the electrode.

If the strong voltage (V) for example 20 Kv–60 Kv is given to such electrodes, the electric field strength satisfies these equations.

$$E_1 = \frac{\epsilon r \cdot V}{2\epsilon r d_1 + d_2} \quad (1)$$

$$E_2 = \frac{V}{2\epsilon r d_1 + d_2} \quad (2)$$

The withstanding voltage strength of the solid dielectric ($D_1$); V.Kv/m
the dielectric constant of the solid dielectric: $\epsilon_1$
the electric field strength of the solid dielectric: $E_1$
the interval of the solid dielectric: $d_1$
the with-standing voltage strength of the liquid dielectric ($D_2$): $V_2$ Kv/m
the dielectric constant of the liquid dielectric: $\epsilon_2$
the electric field strength of the liquid dielectric: $E_2$
the interval of the liquid dielectric: $d_2$
the ratio of the two dielectrics: $\epsilon_2/\epsilon_1 = \epsilon r$.

As we can know from the above equations, if $\epsilon r$, the ratio of the two dielectrics, is much smaller than 1, low electric field strength is formed in the solid dielectric ($D_1$) in comparison with the liquid dielectrode ($D_2$).

Reversely if strong electric field strength is formed in the liquid dielectric ($D_2$) and the electric field strength exceeds the withstanding voltage strength of its own, the dielectric breakdown, that is, ionization by collision happens, and if it receives the electric field strength lower than the withstanding voltage strength of its own, it becomes the stable state. Accordingly to above method, the water ($H_2O$), liquid dielectric, can be decomposed with hydrogen and oxygen.

Now "U", which we can see from FIG. 1 and FIG. 2, is made of solid dielectric of the type of ceramics which has exceedingly high relative dielectric constant in comparison with 80 and can resist high withstanding voltage strength and high temperature.

If we make complex dielectric layer which is filled with water in the middle interval ($d_2$) and tens of thousand voltage is flowed into the electrode (p), then, as the relative dielectric constant becomes $\epsilon r/1$ by the equation (1) and (2), the water receives electric field strength of its own and the molecules of the water are decomposed into hydrogen and oxygen by the ionization by collision.

As the both side of solid dielectric receives weak electric field strength short of the withstanding voltage strength of its own and restrain electric discharge current to flow in the stable state, water is continuously decomposed by receiving the strong electric field strength.

These phenomena can be happened on the condition that relative dielectric constant of the solid dielectric is tens of times or hundreds of times as high as that of the water, that is, $\epsilon r<<1$ and its nature is such that it can resist the withstanding voltage strength and high temperature, and there is the system of ceramics which satisfies these conditions and so there is no difficulty in decomposing water by using the theory of the distributive electric field strength of the complex dielectric layer and ionization by collision of the dielectric.

Figure 3:
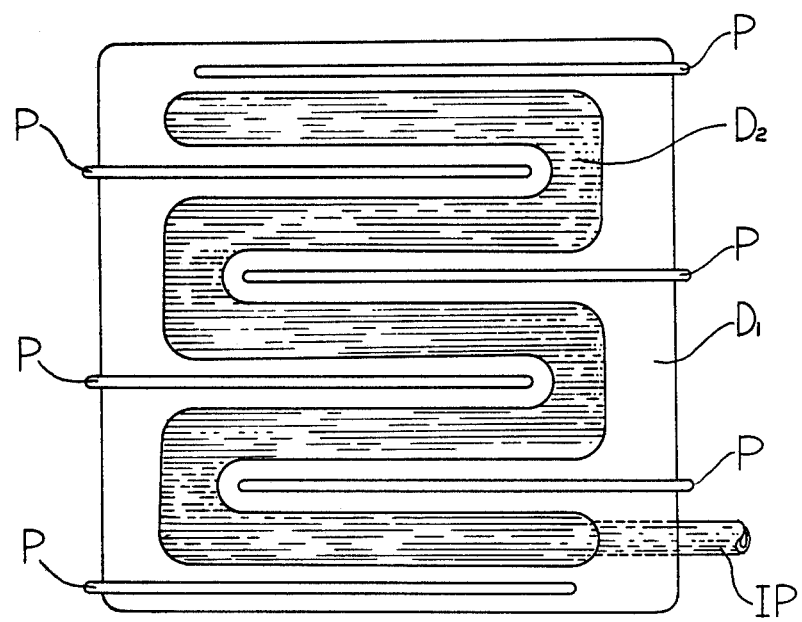
FIG. 3: a cross section for illustration many-step decomposition device as an example.

In order to be intended for proctical use, we can make many-step complex dielectric layer as FIG. 3 to decompose more water for the same time and by continuously supplying water to initection pipe (Ip), water is continuously decomposed.

Figure 4:
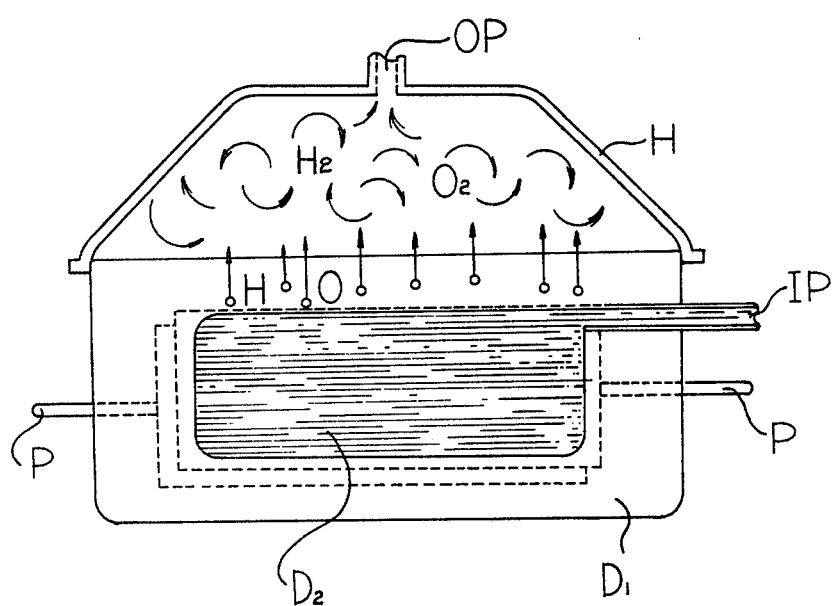
FIG. 4: a side-view illustration figure of FIG. 3.

As is illustrated in FIG. 4, by installing gas-gathering-house(H) on the upper part of the complex dielectric layer, we can separate the hydrogen and oxygen by liquefaction or can use mixing gas as it is.

Above method is excellent in that it does not need other additions in comparison with electrolysis and the electrode is little coasted from the electric discharge current and needs no treatment.

According to the example, the relative dielectric constant of the ceramics, solid dielectric; $E_1 = 3500$.

the thickness of the dielectric layer; $D_1 = 5$ mm the withstanding voltage strength ($V_1$); $V_1 =$ over 54 Kv/mm the thickness of the liquid dielectric layer filled with water; $d_2 = 2$ mm Like FIG. 1 and FIG. 2, we made complex dielectric layer and the voltage of 50 Kv flowed into the electrode (p) installed at the both side and the solid dielectric ($D_1$) received the electric field strength $E_1 = 0.52$ Kv/mm and it became in stable state because it is short of the withstanding electric strength, and the water received electric field strenght $E_2 = 22.42$ Kv/mm and the ionization by collision happened and was decomposed with the hydrogen and oxygen. Then, as 7.2 cc was decomposed from the warer, the mixing oxygen and hydrogen gas was collected.

What I claim is:

1. A water decomposition method utilizing ionization by collision, said method comprising the steps of:

providing a solid dielectric container formed from a material having a substantially higher dielectric constant than that of water and capable of withstanding voltages greater than about 20 Kv without electrical or physical breakdown, said container having a liquid-receiving space;

positioning a pair of electrodes on opposite sides of the outside of said liquid-receiving space of said container;

filling the liquid-receiving space of said solid dielectric container with water characterized by a covalent bond;

applying a continuous voltage greater than about 20 Kv to said solid dielectric container and across said electrodes to subject said water to a strong electric field strength exceeding the covalent bond strength thereof;

wherein said water is decomposed continually, by ionization by collision, into hydrogen and oxygen for so long as the voltage is applied to said electrodes;

collecting the hydrogen and oxygen gases that are evolved; and continuously refilling said liquid-receiving space with water to maintain a predetermined quantity of water therein as decomposition occurs.

2. The method of claim 1, wherein the solid dielectric container is made of ceramic.

3. The method of claim 1, wherein said strong electric field strength is in the range 20 Kv/mm–60 Kv/mm.

4. The method of claim 1, wherein said strong electric field strength is greater than about 50 Kv/mm.

5. The method of claim 1, wherein said solid dielectric container comprises two parallel dielectric slabs having a dielectric constant greater than ten times that of water.

6. The method of claim 5, wherein said liquid dielectric comprises pure water.

* * * * *